June 5, 1934.  A. O. ABBOTT, JR  1,961,727
TIRE SHAPING MACHINE
Filed Feb. 2, 1931  3 Sheets-Sheet 2
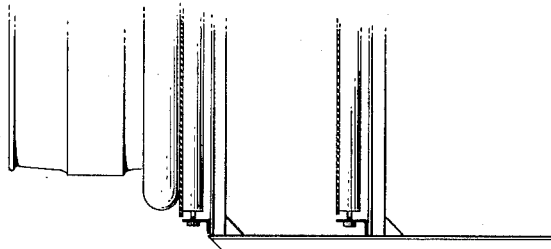
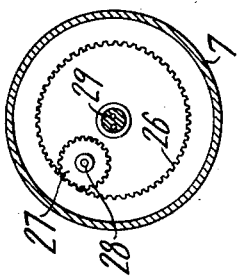
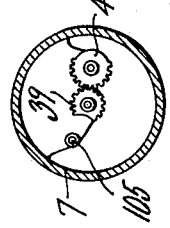
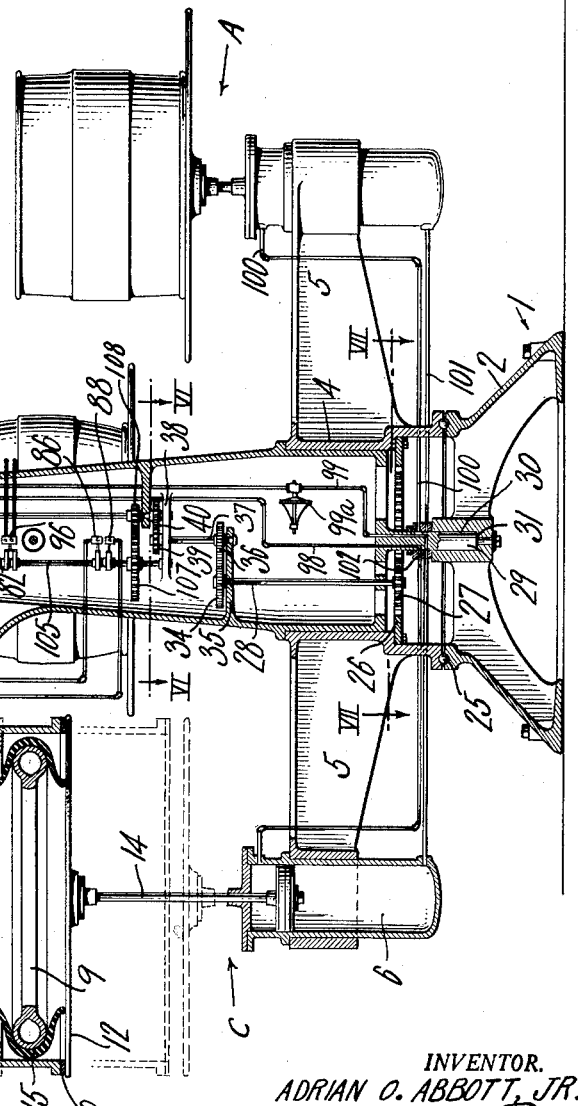
INVENTOR.
ADRIAN O. ABBOTT, JR.
BY
ATTORNEYS.

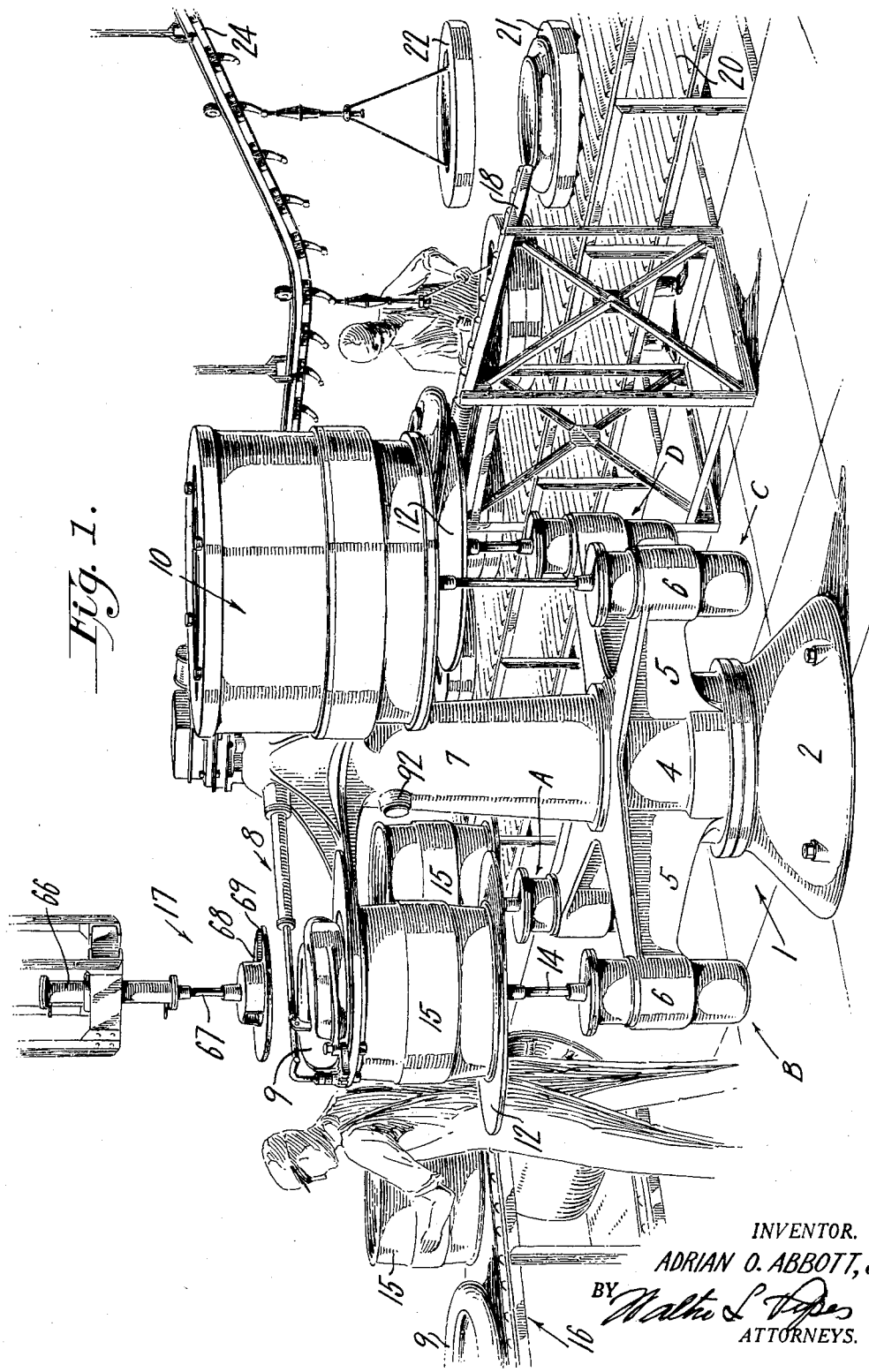

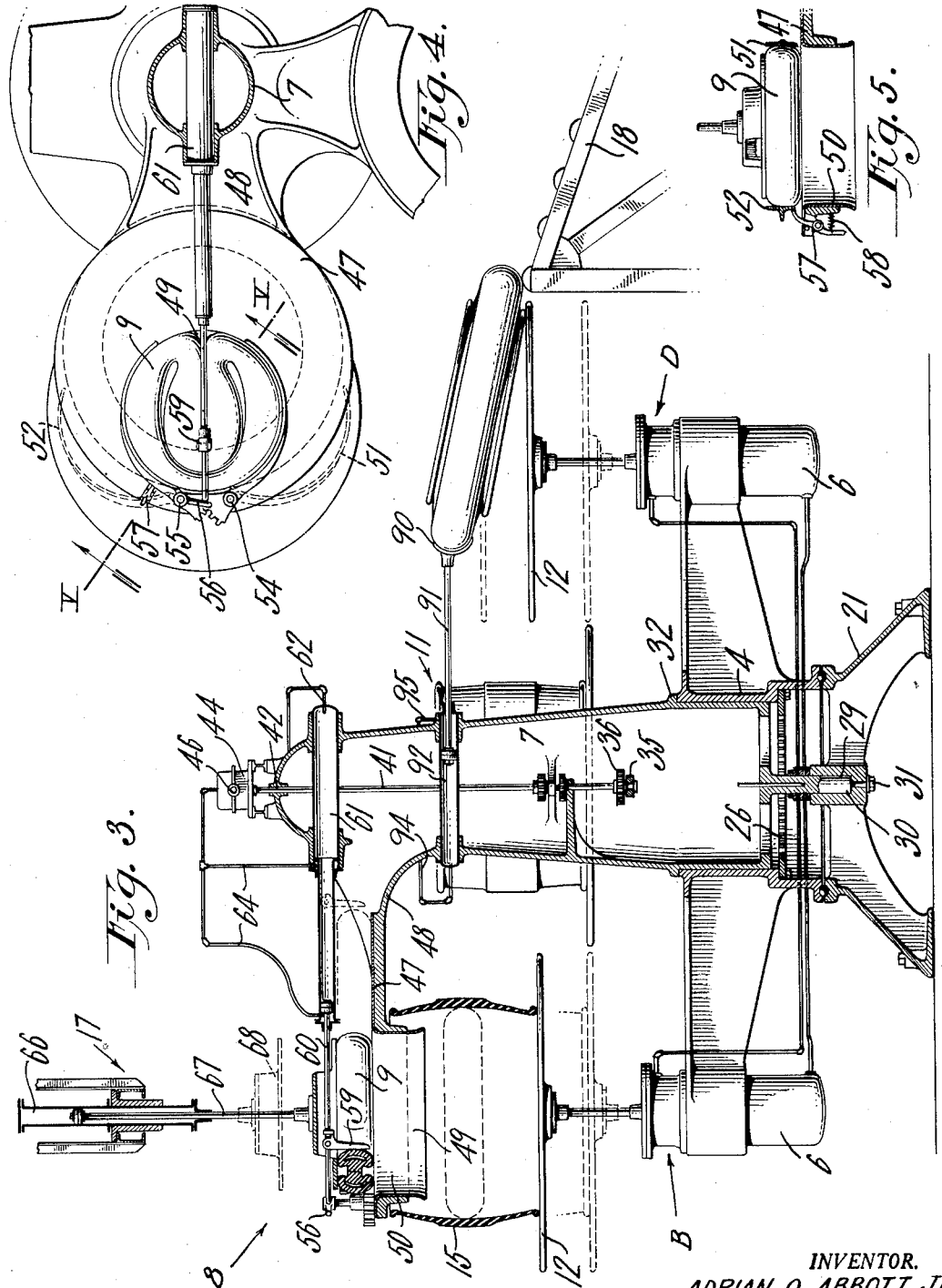

Patented June 5, 1934

1,961,727

UNITED STATES PATENT OFFICE 1,961,727

TIRE SHAPING MACHINE

Adrian O. Abbott, Jr., Grosse Pointe Park, Mich., assignor to Morgan & Wright, Detroit, Mich., a corporation of Michigan Application February 2, 1931, Serial No. 512,777

16 Claims. (Cl. 18—2)

My invention relates to tire shaping machines and more particularly to automatic tire expanding and bagging machines.

In the manufacture of automobile tires a method now in extensive use is that of forming each tire carcass in a cylindrical or band shape. The band is then subjected to differential pressure between its inner and outer faces for giving it a curved shape in cross section. The partially shaped tire is subsequently placed in a mold and subjected to pressure during a curing operation for causing the outer surface of the tire to take the impression of the mold configuration, whereby the tread design and other markings are impressed on the tire. Fluid tight curing bags must be inserted in such tires prior to their being placed in the molds. As such curing bags are relatively large and stiff, considerable muscular effort is required to buckle them and insert them into the partially shaped tires.

It has also been proposed to buckle or compress such curing bags by machinery and introduce the compressed bags into the tires. Many of these machines have required the transportation of the tires, bags and/or assembled tires and bags between the separate operations and also to place them in the molds.

I provide a machine for automatically compressing or buckling successive curing bags and feeding them into tire bands in a released condition. The tire bands are then shaped with the curing bags in place and are automatically conveyed to positions for placing them in the molds. The shaping operation is entirely automatic except for the placing of bands and bags into the machine by an operator. If desired, the bags may be brought within reach of the operator by an endless conveyor.

The accompanying drawings illustrate a present preferred embodiment of the invention, in which Figure 1 is a perspective view of a machine embodying my invention;

Fig. 2 is a cross sectional view thereof taken substantially along a section line passing through stations A and C of Fig. 1;

Fig. 3 is a view similar to Fig. 2 except that it is taken along a section line extending substantially through stations B and D;

Fig. 4 is a plan view of the mechanism for collapsing the curing bags;

Fig. 5 is a sectional view of the collapsing mechanism taken substantially along the section line V—V of Fig. 4 with a bag in position;

Fig. 6 is a sectional view of the turret taken substantially along the section line VI—VI of Fig. 2 showing the intermittent gears; and Fig. 7 is a sectional view taken along the section line VII—VII of Fig. 2.

Referring to the drawings, a turret 1 comprises a base 2 on which there is mounted a hub 4 having a plurality of arms 5, each of which terminates in a vertically extending cylinder 6. A stationary tower 7 is secured to the base 2 and extends through the hub 4. The tower 7 supports a mechanism 8 for collapsing curing bags 9, a mechanism 10 for shaping tire bands, and an ejecting mechanism 11. The several mechanisms 8, 10 and 11 are held stationary while the several arms 5 are successively moved into co-operating positions with the mechanisms. The number of the arms 5 may be varied, although I have illustrated four of them secured to the hub 4. The arms are moved intermittently and the amount of the angular movement of each arm during each movement is determined by the number of arms which co-operate with the mechanisms 8, 10 and 11. In the illustrated embodiment of the invention each arm is moved 90° during each of its movements. The mechanism for moving the arms is hereinafter described. A platform or support 12 for tire bands is supported from each cylinder 6 by a piston rod 14 extending into the cylinder so that the relative elevations of the supports 12 may be varied.

For illustrative purposes the several stations at which operations take place have been labeled A, B, C and D. At station A the successive supports 12 are in lowered positions for the reception of tire bands 15. The tire bands 15 are preferably brought within reach of an operator by an endless conveyor 16 from which the operator manually transfers them to the supports.

At station B the operator places expanded bags 9, taken from the conveyor 16, into the collapsing mechanism 8. Each co-operating support 12 is raised slightly so that a collapsed bag may be fed into the band mounted thereon by mechanism 17 hereinafter described.

At station C the tire bands are given a curved shape about the bags by the mechanism 10.

At station D the assembled tires and bags are ejected from the successive supports 12 by the mechanism 11. A run-off conveyor 18 is disposed in position to receive the discharged tires and convey them to an endless conveyor 20 on which mold sections 21 are carried. When each tire and bag have been placed in a mold section 21, the mold is completed by the application of a mold section 22 which is brought into reach of an operator by an overhead conveyor 24.

The several operations are performed automatically by mechanism hereinafter described, which includes a motor and a plurality of cam operated valves so that the only operations performed by operators are the placing of the bags 9 in the mechanism 8, the placing of the bands 15 on the supports 12 and the closing of the molds on the conveyor 20.

Turret operating mechanism

Referring particularly to Figs. 2, 3, 6 and 7, the hub 4 is rotated about the tower 7 on roller bearings 25 by a gear 26 meshing with a gear 27 carried on a shaft 28 extending upwardly within the tower. The tower 7 is secured to the base 2 by a projecting lug 29 seated in a socket 30 in the base 2. The projecting lug 29 is held against rotation in the socket 30 by a screw 31. The hub 4 at its upper edge bears against a flange 32 on the tower 7 so that the hub 4 is free to rotate about the projecting lug 29 as a center while the tower 7 is held in an upright rigid position.

Driving movement is imparted to the shaft 28 by a gear 34 mounted at its upper end and resting on a bracket 35 in the tower 7. The gear 34 meshes with a gear 36 mounted on a shaft 37 extending upwardly through a bracket 38 and terminating in an intermittent gear 39, illustrated in Fig. 6. The gear 39 meshes with an intermittent gear 40, illustrated in Fig. 6 and mounted on a shaft 41. The shaft 41 extends through a bushing 42 in the tower 7 and into a housing 44 for a reducing gear. A motor 45 is connected to the gearing within the housing 44 by a shaft 46. The motor 45 runs continuously for rotating the shaft 41. The latter in turn continuously drives the gear 40, but the co-operating gear 39 is rotated intermittently by an amount determined by the design of the gears 39 and 40. The rotation of the gear 39 is transmitted to the hub 4 for simultaneously rotating the arms 5 by a predetermined angular movement. I have illustrated the movement as being 90° upon each actuation, although it is to be understood that the exact amount of the rotation upon each actuation may be varied as desired and in accordance with the number of arms 5 co-operating with the mechanisms 8, 10 and 11.

Bag collapsing mechanism

Referring particularly to Figs. 1, 3 and 4, the bag collapsing mechanism 8 comprises a shelf or support 47 secured to the tower 7 by a bracket 48. The length of the bracket 48 and the dimensions of the support 47 are such that an opening 49 extending through the support 47 is in substantial alinement with the piston rod 14 of the cylinder 6 positioned therebeneath.

The support 47 is covered with a metallic apron 50 which extends downwardly through the opening 49 a sufficient distance to center within a tire 15 a bag 9 discharged through the opening 49. The dimensions of the opening 49 are such as to accommodate a collapsed bag.

As shown in dotted lines in Fig. 4, each bag 9 is initially placed on the support 47 in extended position between a pair of clam shell arms 51 and 52 which are mounted on the support 47 by pins 54 and 55, respectively. The arms 51 and 52 are each provided with a tailpiece terminating in meshing gear teeth so that movement of either arm is imparted to the other. A lever 56 is mounted on the tailpiece of the arm 52 for imparting a closing movement to these arms, as hereinafter described. A latch 57 is mounted on the support 47 in the path of movement of the arm 52 so that after the arm moves over the latch it is pulled upwardly by a spring 58, illustrated in Fig. 5, to engage the arm 52, thereby locking both of the arms in their closed positions for holding a collapsed bag 9.

For applying a collapsing force to the bag there is provided a lug 59 pivotally mounted on a piston rod 60 which extends into a telescoping cylinder 61. A pipe line 62 is connected to the stationary end of the cylinder 61 and a flexible pipe line 64 is connected to two points in the moving end of the cylinder. Upon the admission of fluid under pressure to the pipe line 62, the cylinder 61 is expanded and the piston rod 60 thrust forwardly so that the lug 59 engages the outer periphery of the bag 9 and presses it into the collapsed position particularly illustrated in Figs. 3 and 4.

The admission of fluid under pressure to the pipe lines 64 collapses the cylinder for withdrawing the lug 59 and the piston rod 60 from engagement with the bag after the arms 51 and 52 have been locked in their closed positions by the latch 57. The piston rod 60 extends beyond the lug 59 and engages the lever 56 for closing the clam shell arms 51 and 52 at substantially the end of the bag compressing stroke.

Admission of fluid under pressure to the pipe lines 62 and 64 is controlled by a cam operated valve 65. The operation of the valve mechanism is hereinafter described in detail. The valve operates to advance the piston rod 60 after the operator places a bag 9 on the support 7 and then retracts the piston rod out of the way of the mechanism 17 before the latter operates to push the collapsed bag through the opening 49.

In the meantime a tire band 15 placed on a support 12 at the position A has been brought to rest in a position beneath the support 47. The support 12 is raised slightly so that the upper edge of the band 15 engages the lower face of the support 47 outside of the apron 50. In this position the mechanism 17 operates to push the bag through the opening 49.

The mechanism 17 comprises a downwardly projecting cylinder 66 which is stationarily mounted above the mechanism 8. A piston rod 67 extends downwardly from the cylinder 66 and carries a pusher 68 in the form of a disc shoe which may have a cut away portion 69 for clearing the piston rod 60 should the latter not be fully withdrawn. Downward pressure of the pusher 68 on the collapsed bag forces it from between the arms 51 and 52 through the opening 49 and into the band 15 where it expands by reason of its inherent resiliency. The support 12 is then lowered as the pusher is raised. The support 12 then moves to the position C. The operator releases the latch 57 and swings the arms 51 and 52 outwardly to receive the next bag.

The cylinder 66 is controlled by a cam operated valve 70 to which it is connected by pipe lines 71 and 72. Fluid under pressure transmitted through the pipe line 71 moves the piston rod 67 and the pusher 68 downwardly while fluid under pressure traversing the pipe line 72 raises them.

Tire shaping mechanism

The tire shaping mechanism 10 located at station C is particularly illustrated in Fig. 2 and comprises a housing 74 supported by a bracket 75 on the tower 7. The housing 74 has an inner wall 76 and an outer wall 77 forming an annular chamber in which an annular band 78 is slidable as a piston. The bottom of the housing 74 is closed by a casting 79 which is supported by the inner wall 76. The annular piston 78 has a snug sliding fit with the outer edge of the casting 79. The casting 79 affords a substantially flat surface for engagement with the upper edge of each tire band 15. The lower edge of the piston 78 is provided with a ring 80 of soft rubber for engaging the upper surfaces of the several supports 12 outside of the bands 15 so that the latter are enclosed in a substantially fluid tight chamber between the upper surface of the support 12, the bottom of the casting 79 and the inner surface of the piston 78. Fluid is admitted to each cylinder 6 to raise the co-operating support 12 when it is in registry with the shaping device 10, as hereinafter described.

Downward movement of the piston 78 is controlled by a pipe line 81 connected to a valve 82. Upward movement is controlled by a pipe line 84 connected to the same valve.

As soon as the support 12 has moved upwardly far enough to engage the lowered rubber ring 80 on the piston 78 for forming a substantially liquid tight chamber, vacuum is applied in the chamber outside of the tire band 15 through a pipe line 85 which is controlled by a valve 86. Continuous upward movement of the support 12 coupled with the expanding action of the vacuum applied externally of the tire band and the expansive action of the curing bag 9 within the tire causes the band to bulge outwardly to transfer it into the tire shape while the curing bag adjusts itself to its annular form within the expanding pulley band. When the tire has reached substantially its limit of expansion by vacuum, air under pressure is admitted to the interior of the tire through pipe 87 by the operation of a valve 88. The fluid under pressure adds a force which expands the tire a little more so that the bag 9 freely adjusts itself to proper assembly with the tire casing. It will be understood that the differential in pressure between the outer surfaces of the band acts to expand the tire relatively more in proportion to the dimensions of the bag than would be the case if only super-atmospheric pressure were admitted to the interior of the tire casing. Also, the mechanical effect of expanding the tire by vacuum and allowing pressure to develop within the tire, as above outlined, makes the expanding units self-contained so that the pressure between the platform 12 and the casting 79 is counteracted thereby eliminating the need for increasing the pressure within the cylinder 6 more than the pressure just necessary to carry the tire into contact with the expanding device. If pressure were developed within the tire alone, a counteracting pressure would have to be developed in cylinder 6 with the consequent stress upon the frame of the machine itself and the arms and piston rods carrying the several supports 12.

Upon completion of the shaping of the tire the valve boxes are set in operation so that the vacuum line 85 is closed; fluid pressure to the interior of the tire through the pipe line 87 is turned off; the piston 78 is elevated and the support 12 is lowered carrying with it the assembled tire casing and bag. When the support 12 has substantially completed its lowering motion, the turret is operated to move it from the position C to the position D.

Discharge mechanism

At the station D the support 12 is elevated far enough so that the tire may be slid onto the take off conveyor 18. This is accomplished by raising the tire and bag slightly above the top of the conveyor where the tire is engaged by a shoe 90 carried on a piston rod 91 extending into a cylinder 92 constituting the mechanism 11. The cylinder 92 is controlled by pipe lines 94 and 95 leading to a valve 96. Admission of fluid through the pipe line 94 causes the piston rod 91 to be projected outwardly to shove the tire off from the support 12. At the same time the support 12 lowers slightly so that the tire is tipped, as illustrated in Fig. 3, and is then slid onto the conveyor 18. Fluid is then admitted to the cylinder 92 through the pipe line 95 for withdrawing the piston rod 91 and shoe 90.

The tire runs down the conveyor 19 to the conveyor 20 where it is placed in a mold section 21, and a complementary mold section 22 is placed thereover. They are then carried by the conveyor 20 to a suitable vulcanizing or curing mechanism not shown.

Accordingly, with each revolution of the turret 1, four tire bands are shaped with curing bags inserted therein.

Control of cylinders 6

The several cylinders 6 are under the control of valve 97 which is connected to pipe lines 98 and 99 extending downwardly into the lug 29 at the base of the turret. Pipe line 98 terminates at a port which aligns with a port in the collar 102 from which the pipe line continues as line 100 to the upper connection of the cylinder 6. The pipe line 99 makes a similar port connection at the junction of lug 29 and collar 102, and then continues as pipe line 101 to the lower connection of the cylinder. A pressure regulating and reducing valve 99a intercepts line 99 between the valve 97 and the lug 29. It will be understood that the pipe lines 98 and 99 terminate in three sets of ports corresponding to the stations B, C and D, and that the cylinder of each of these stations is connected by pipe lines to the rotatable collar surrounding the ported lug 29. These connections operate so that admission of fluid under pressure to the pipe lines 101 elevates the support 12 while admission of fluid under pressure to the pipe lines 100 lowers the supports. As the amount of elevation of the supports varies between the stations B, C and D, the reducing valve 99a may be regulated to provide only such pressure that at the various stations the amount of elevation will be determined by reacting forces tending to restrict the amount of elevation. For example, at station B each support 12 is only raised far enough to cause the band to engage the support 47. Further elevation is restricted for reason that the reducing valve is regulated to supply only such pressure that the pulley band by its own structure and without buckling will be able to withstand the pressure introduced within the cylinder. At station C, however, the support is raised far enough to cause the shaping of the band; and, at station D, the support being unrestricted is permitted to elevate according to the maximum stroke of the piston within cylinder 6.

Valve operating mechanism

The several valves 65, 97, 70, 82, 96, 86 and 88 are actuated by a shaft 105 which extends between the bracket 38 and a bushing 106 at the top of the tower 7. The shaft is continuously rotated by gear 107 meshing with a gear 108 on the shaft 41. The several valves, except valve 86, are connected to a source of fluid under pressure not shown, while the valve 86 is connected to a vacuum pump not shown. Accordingly, as the motor 45 rotates, the several valves are automatically actuated in synchronism with the intermittent movement of the hub 4 for causing the automatic collapsing of the bags placed on the support 47 by the operator, the feeding of the bags to the tire bands, the shaping of the tire bands, and the discharge of the shaped bands and bags to the conveyor 20.

While I have shown and described a present preferred embodiment of my invention, it is to be understood that it may be otherwise embodied within the spirit of the invention and the scope of the appended claims.

Having thus described my invention, what I claim and desire to protect by Letters Patent is:

1. In tire shaping and bagging apparatus, a plurality of supports for tire bands movable relatively to means for collapsing curing bags, means for inserting collapsed bags into tire bands, means for shaping the bands into tire form with the bags enclosed, and means for discharging the shaped tires and bags from the apparatus.

2. In tire shaping and bagging apparatus, a plurality of supports for tire bands movable relatively to means for collapsing curing bags, means for inserting collapsed bags into tire bands, means for shaping the bands into tire form with the bags enclosed, means for discharging the shaped tires and bags from the apparatus, and a conveyor for receiving the discharged tires and bags.

3. In tire shaping and bagging apparatus, a plurality of movable supports for tire bands adapted to successively co-operate with means for collapsing curing bags and inserting them into tire bands on said supports, means for shaping the bands into tire form with the bags enclosed, and means for discharging the shaped tires and bags from the apparatus.

4. In tire shaping and bagging apparatus, a plurality of movable supports for tire bands adapted to automatically co-operate with means for collapsing curing bags and inserting them into tire bands on said supports, means for shaping the bands into tire form with the bags enclosed, and means for discharging the shaped tires and bags from the apparatus.

5. In tire shaping and bagging apparatus, a plurality of movable supports for tire bands adapted to successively and automatically co-operate with means for collapsing curing bags and inserting them into tire bands on said supports, means for shaping the bands into tire form with the bags enclosed, and means for discharging the shaped tires and bags from the apparatus.

6. In tire shaping and bagging apparatus, a support for a shaping bag having an opening therein of a size to permit the passage of a collapsed bag, a plurality of supports for tire bands movable for successive registry with said opening, means for collapsing the bag while resting on said support, and means for forcing collapsed bags through said opening for engagement with tire bands carried by the movable supports.

7. In a tire shaping and bagging apparatus, a plurality of supports for tire bands, a support for a shaping bag having an opening of a size to permit the passage of a collapsed bag, means for causing relative movement between said band supports and bag support, and means for collapsing bags on said support and inserting them through said opening into bands carried by successive band supports.

8. Means for collapsing a tire shaping bag comprising a support for the bag, interconnected movable members for engaging and collapsing portions of the bag, movable means for pressing the bag against said members, connecting means actuated by said pressing means between said members and pressing means, and a source of power for causing movement of said members and means to collapse a bag.

9. Means for collapsing a tire shaping bag comprising a support for the bag, interconnected movable arms for engaging and collapsing portions of the bag, movable means for pressing the bag against said arms, an extension on said pressing means for actuating said arms, and a source of power for causing movement of said arms and means to collapse a bag.

10. Means for collapsing a tire shaping bag comprising a support for the bag, interconnected movable members for engaging and collapsing portions of the bag, movable means for pressing the bag against said members, connecting means between said members and pressing means, a source of power for causing movement of said members and means to collapse a bag, and means for locking said members in a position to retain a collapsed bag.

11. Means for collapsing a tire shaping bag comprising a support for the bag, interconnected movable arms for engaging and collapsing portions of the bag, movable means for pressing the bag against said arms, connecting means between said arms and pressing means, a source of power for causing movement of said arms and means to collapse a bag, and means for locking said arms in a position to retain a collapsed bag.

12. In a tire shaping device, a double walled housing for engaging an edge of a tire band, means for surrounding said band projecting from between said walls and serving as a piston, and a relatively movable support for said band and surrounding means for completing a chamber in which said band is disposed.

13. A tire shaping device comprising a double walled housing for engaging an edge of a tire band, means for surrounding said band projecting from between said walls and serving as a piston, a relatively movable support for said band and surrounding means for completing a chamber in which said band is disposed, and means for creating a condition of pressure differential between opposite surfaces of said band.

14. A tire shaping device comprising a double walled housing for engaging an edge of a tire band, means for surrounding said band projecting from between said walls and serving as a piston, a relatively movable support for said band and surrounding means for completing a chamber in which said band is disposed, means for creating a vacuous condition exteriorly of said band, and means for applying excess pressure within said band.

15. In tire shaping and bagging apparatus, a turret comprising movable arms, a vertically movable support for a tire band on each arm, a support for curing bags, automatic means for collapsing bags on said support and supplying them to tire bands on successive supports, means for automatically shaping the bands while on said supports, and means for automatically removing the shaped bands from said supports.

16. In a tire shaping and bagging apparatus, a plurality of supports for tire bands movable relatively to means for collapsing curing bags, means for inserting collapsed bags into tire bands, and means for shaping the bands into tire form with the bags enclosed.

ADRIAN O. ABBOTT, Jr.